(12) United States Patent
Brusilovsky

(10) Patent No.: US 9,244,453 B2
(45) Date of Patent: Jan. 26, 2016

(54) DYNAMIC WIZARD EXECUTION

(71) Applicant: General Electric Company, Schenectady, NY (US)

(72) Inventor: Mikhail Brusilovsky, Billerica, MA (US)

( * ) Notice: Subject to any disclaimer, the term of this patent is extended or adjusted under 35 U.S.C. 154(b) by 240 days.

(21) Appl. No.: 13/910,962

(22) Filed: Jun. 5, 2013

(65) Prior Publication Data
US 2014/0365020 A1    Dec. 11, 2014

(51) Int. Cl.
*G05D 7/00* (2006.01)
*G06F 3/048* (2013.01)
*G05B 19/042* (2006.01)

(52) U.S. Cl.
CPC .. *G05B 19/0426* (2013.01); *G05B 2219/23128* (2013.01); *G05B 2219/23165* (2013.01)

(58) Field of Classification Search
CPC ........... G05D 7/06; G05D 2219/25428; G05B 13/042; G05B 2219/32015
USPC ........................................................ 715/771
See application file for complete search history.

(56) References Cited

U.S. PATENT DOCUMENTS

| | | | |
|---|---|---|---|
| 5,481,716 A * | 1/1996 | Morshedi et al. | 717/106 |
| 5,980,078 A * | 11/1999 | Krivoshein et al. | 700/1 |
| 6,201,996 B1 * | 3/2001 | Crater et al. | 700/9 |
| 6,446,202 B1 * | 9/2002 | Krivoshein et al. | 713/1 |
| 6,993,456 B2 * | 1/2006 | Brooks et al. | 702/183 |
| 8,065,653 B1 | 11/2011 | Best et al. | |
| 8,762,588 B2 * | 6/2014 | Hildebran et al. | 710/9 |
| 2003/0149526 A1 * | 8/2003 | Zhou et al. | 701/213 |
| 2005/0066285 A1 | 3/2005 | Santori et al. | |
| 2005/0137731 A1 | 6/2005 | Haag et al. | |
| 2005/0270063 A1 * | 12/2005 | Cornett | 326/39 |
| 2006/0069689 A1 * | 3/2006 | Karklins et al. | 707/100 |
| 2006/0168013 A1 * | 7/2006 | Wilson et al. | 709/206 |
| 2009/0326852 A1 * | 12/2009 | Vetter et al. | 702/108 |
| 2010/0082814 A1 * | 4/2010 | Plache et al. | 709/226 |
| 2010/0088626 A1 * | 4/2010 | Rubanovich | 715/773 |
| 2012/0041570 A1 * | 2/2012 | Jones et al. | 700/17 |
| 2012/0079438 A1 | 3/2012 | Paciaroni et al. | |
| 2012/0260002 A1 * | 10/2012 | Hildebran et al. | 710/9 |
| 2013/0253872 A1 * | 9/2013 | Curtis et al. | 702/100 |

OTHER PUBLICATIONS

International Search Report and Written Opinion issued in connection with corresponding PCT Application No. PCT/US2014/034459 on Aug. 29, 2014.

\* cited by examiner

*Primary Examiner* — Tadeese Hailu
(74) *Attorney, Agent, or Firm* — Fletcher Yoder, P.C.

(57) ABSTRACT

Systems and methods are provided for a non-transitory computer readable medium storing instructions is configured to provide a configuration wizard. The configuration wizard is configured to display, via a single screen, a first input-receiving control configured to receive a user input and a second input-receiving control configured to receive the user input. The configuration wizard is also configured to display a display area configured to display a first parameter value associated with a device. The first input-receiving control is displayed as active and the second input-receiving control is displayed as inactive. The second input-receiving control is displayed as active based on a first dependency.

20 Claims, 6 Drawing Sheets

FIG. 6

DYNAMIC WIZARD EXECUTION

BACKGROUND OF THE INVENTION

The subject matter disclosed herein relates to software that controls devices, and more particularly to software wizards that may dynamically change parameters.

Certain devices such as sensors, pumps, valves, and the like, may be controlled by a controller using electrical signals. For example, the controller may use a communications bus to send and receive signals from the various devices. The controller and communications bus may be connected to a central control interface where a user can electronically interact with the devices. Each device may have many possible operations and settings, such as functions or parameters that a user may set up during initial configuration and adjust throughout the lifetime of the device. It would be beneficial to provide for techniques useful in improving the adjustment of the device.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In one embodiment, a non-transitory computer readable medium storing instructions is configured to provide a configuration wizard. The configuration wizard is configured to display, via a single screen, a first input-receiving control configured to receive a user input and a second input-receiving control configured to receive the user input. The configuration wizard is also configured to display a display area configured to display a first parameter value associated with a device. The first input-receiving control is displayed as active and the second input-receiving control is displayed as inactive. The second input-receiving control is displayed as active based on a first dependency.

In another embodiment, a method, includes providing a configuration wizard, the configuration wizard configured to display, via a single screen, a first input-receiving control configured to receive a user input and a second input-receiving control configured to receive the user input. The configuration wizard is also configured to display a display area configured to display a first parameter value associated with a device. The first input-receiving control is displayed as active and the second input-receiving control is displayed as inactive, and the second input receiving control is displayed as active based on a first dependency.

In yet another embodiment, a system includes a processor configured to display a configuration wizard configured to configure a device. The configuration wizard has a first input-receiving control configured to receive a user input and a second input-receiving control configured to receive the user input. The configuration wizard also has a single display screen configured to display the first and second input-receiving controls. The display screen includes a display area configured to display a first parameter value associated with a device. The first input-receiving control is displayed as active and the second input-receiving control is displayed as inactive, and the second input-receiving control is displayed as active based on a first dependency.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein:

FIG. 6 is an embodiment of a possible user interface for the dynamic wizard of FIG. 2;

DETAILED DESCRIPTION OF THE INVENTION

One or more specific embodiments of the invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the invention, the articles "a," "an," "the," and "said" are intended to mean that there are one or more of the elements. The terms "comprising," "including," and "having" are intended to be inclusive and mean that there may be additional elements other than the listed elements.

The disclosed embodiments include a system and a method for a dynamic wizard suitable for adjusting a list of operations for a field device of an industrial control system. In certain embodiments, the dynamic wizard may perform the adjustments without scrolling through pages using 'Next' and 'Back' buttons. Indeed, the dynamic wizard may reuse the same screen and dynamically activate and deactivate controls on the screen, add and remove controls on the screen, update controls on the screen, and/or reorganize controls on the screen. By reusing the same screen, the dynamic wizard may present all information related to the device, such as adjustment information, at the same time and in one location. The wizard may use information dependencies, including multi-level dependencies associated with states of a state machine, which may change the appearance of the screen while displaying all the information related to a device to a user entity. Adjusting operations with the wizard techniques described herein may improve the user entity's identification of operations that are currently being adjusted, and quickly confirm those adjustments before moving to the next step. Indeed, the wizard may provide for non-linear adjustment processes in addition to or alternative to the linear processes provided by wizards employing "Next" and "Back" functionality. The wizard may present input-receiving controls that switch between being active and being inactive based on the state of the wizard and the condition of dependencies associated with each state of a state machine. Likewise, the wizard may use the state machine to activate and deactivate controls on the screen, add and remove controls on the screen, update controls on the screen, and/or reorganize controls on the screen.

Figure 1:
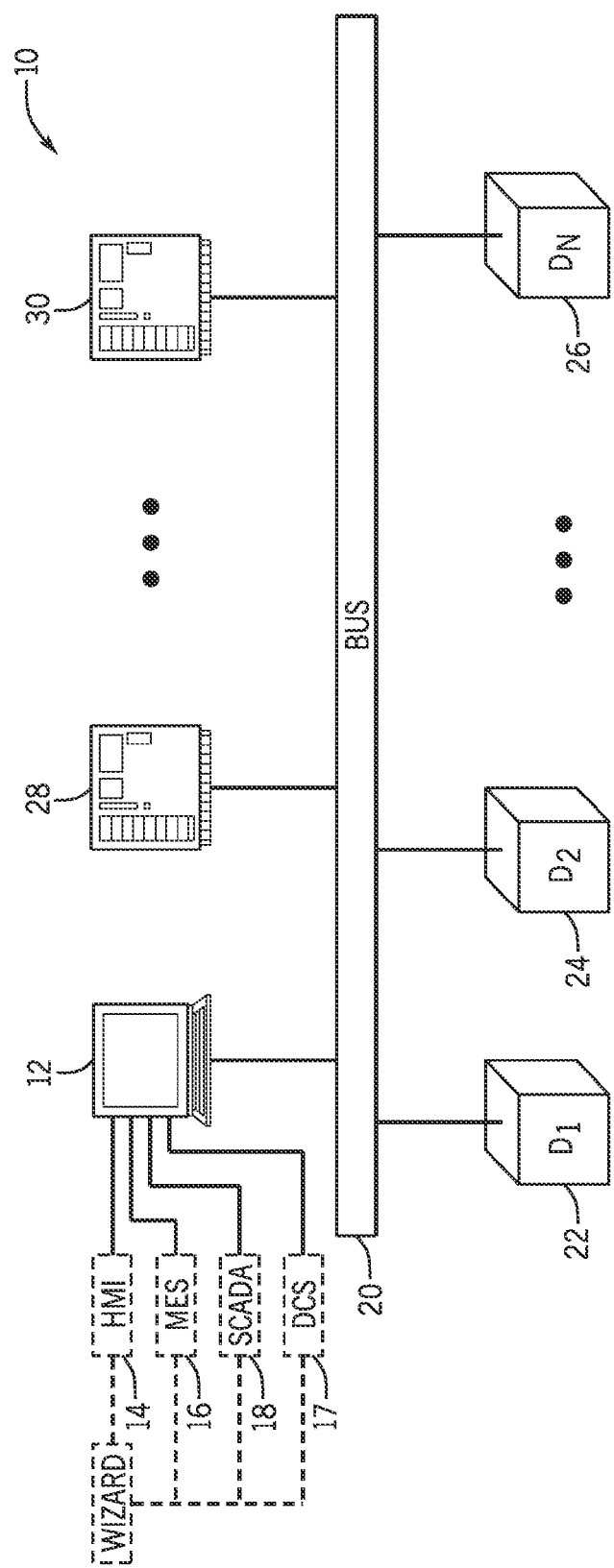
FIG. 1 is a schematic diagram of an embodiment of an industrial control system, including a communications bus and industrial devices communicatively coupled to the communications bus.

It may be useful to describe certain systems that may advantageously use the techniques described herein. Turning to FIG. 1, an embodiment of an industrial process control system 10 is depicted. A computer 12 is suitable for executing a variety of field device configuration and monitoring applications, and provides an operator interface through which an engineer or technician may monitor the components of the industrial process control system 10. The computer 12 may be any type of computing device suitable for running software applications, such as a laptop, a workstation, a tablet computer, or a handheld portable device (e.g., personal digital assistant or cell phone). Indeed, the computer 12 may include any of a variety of hardware and/or operating system platforms. The computer 12 may contain non-transitory computer readable medium storing instructions to carry out the system and method described below.

In accordance with one embodiment, the computer 12 may host an industrial automation system such as a human-machine interface (HMI) system 14, a manufacturing execution system (MES) 16, a distributed computing system (DCS) 17, and/or a supervisory control and data acquisition (SCADA) system 18. Further, the computer 12 is communicatively connected to a bus 20 suitable for enabling communication between the computer 12 and devices $D_1$ 22, $D_2$ 24, and one or more devices $D_N$ 26. The bus 20 may provide for communicative functionality of one or more protocols, including but not limited to Modbus, Fieldbus Foundation™ HART®, Profibus, or a combination thereof. Accordingly, the bus 20 may include Ethernet conduits, serial conduits, and other conduits useful in communicating data. The devices 22, 24, and 26 may include field devices such as flow meters, pumps, sensors, valves, actuators, turbines, and the like, suitable for use in industrial applications. For example, the devices 22, 24, and 26 may include flow meters that measure the velocity and/or volume of fluid passing through a known area. The devices 22, 24, and 26 may additionally or alternatively include temperature meters, pressure meters, clearance (e.g., distance between stationary and rotating components) sensors, chemical sensors, pollution sensors, non-destructive inspection meters (e.g., eddy current, sonographs, optical meters), and so on. It is also to be noted that the devices 22, 24, and 26 may include devices suitable for use in residential applications, such as home automation applications. The devices 22, 24, and 26 may include industrial devices, such as Modbus devices that include support for the Modbus communications protocol available from the Modbus Organization. The devices 22, 24, and 26 may additionally or alternatively include Fieldbus Foundation™ devices that include support for the Foundation H1 bi-directional communications protocol. When commissioning a device, a user (e.g., a commissioning engineer) will update the device's memory with desired parameters including device identification, network parameters suitable for enabling communication through the plant network, and the like. The devices 22, 24, and 26 may also include support for other communication protocols, such as those included in the HART® Communications Foundation (HCF) protocol, and the Profibus Nutzer Organization e.V. (PNO) protocol.

In the depicted embodiment, two programmable logic controllers (PLCs) 28 and 30 are also connected to the bus 20. The PLCs 28 and 30 may use the bus 20 for communicating with and controlling any one of the devices 22, 24, and 26. The bus 20 may be any electronic and/or wireless bus suitable for enabling communications, and may include fiber media, twisted pair cable media, wireless communications hardware, Ethernet cable media (e.g., Cat-5, Cat-7), and the like. Further, the bus 20 may include several sub-buses, such as a high speed Ethernet sub-bus suitable for connecting system 10 components at communication speeds of 100 MB/sec and upwards. The bus 20 may also include an H1 network sub-bus suitable for connecting system 10 components at communications speeds of approximately 31.25 Kb/sec. The sub-buses may intercommunicate with each other, for example, by using linking devices or gateways, such as those gateways available under the designation FG-100 provided by softing AG, of Haar, Germany. Indeed, a number of interconnected sub-buses of the bus 20 may be used to communicate amongst the components of the system 10.

It is to be noted that the industrial process control system 10 depicted in FIG. 1 is greatly simplified for purposes of illustration. The number of components is generally many times greater than the number of depicted components. This is especially the case with regard to the number of depicted devices 22, 24, and 26. Indeed, in an industrial environment, the number of devices may number in the hundreds for the industrial process control system 10. The figure also illustrates a dynamic wizard 36 that may be used to reconfigure, commission, or otherwise interact with the devices 22, 24, and/or 26. The dynamic wizard 36 may be executed by the computing system 12 and may be included, for example, as part of the HMI 14, MES 16, SCADA 18, and/or DCS 17. By utilizing the wizard 36, the user may more efficiently interact with the devices 22, 24, and/or 26, which may lead to a reduction of adjustment errors and a decrease in interaction time. Further details of the wizard 36 are described with respect to FIG. 2.

Figure 2:
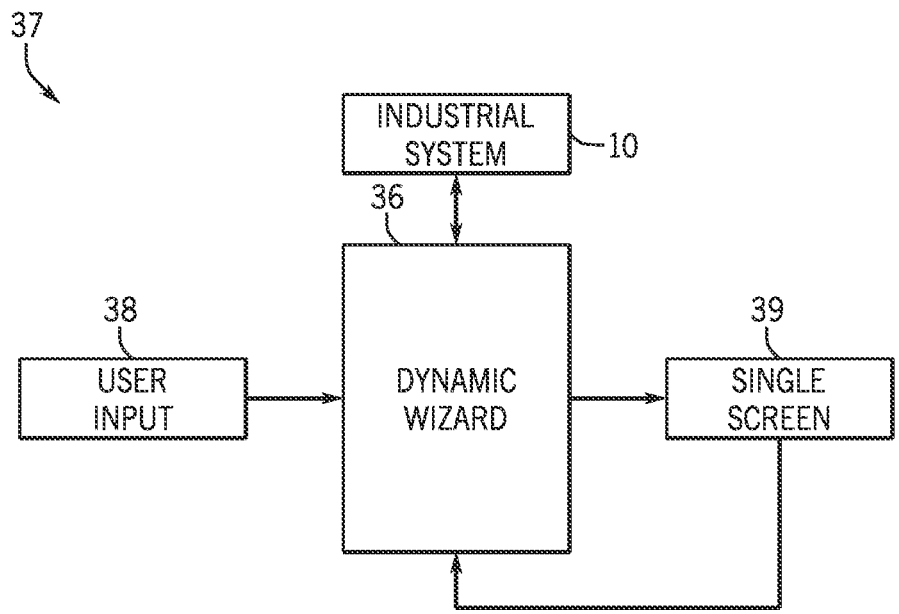
FIG. 2 is a block diagram of an embodiment of a dynamic wizard suitable for mediating interactions between a user entity and the industrial control system of FIG. 1.

FIG. 2 is a block diagram of an embodiment of an information flow 37 between a user entity and the dynamic wizard 36 of FIG. 1. The information flow 37 includes receiving a user input 38 whereby a user entity may interact with the system 10 via the wizard 36, including interactions with the devices 22, 24, 26. User input 38 may be communicated to the system 10 through the computing system 12, for example, through communicative conduits of the bus 20. Any suitable user input 38 may be utilized to communicate with the system 10. The user entity may input using a keyboard and a mouse, or may input commands through a touch screen or some other input mechanism, including but not limited to voice, gestures, and the like. The user input 38 may be collected and interpreted by a dynamic wizard 36. In one embodiment, as the input 38 is collected by the wizard 36, the wizard 36 may then translate the user input 38 into adjustments for the system 10. For example, the adjustments may include modifying operations of the devices, 22, 24, 26 by inserting, updating, and or deleting register values, functions, firmware, parameters (e.g., calibration parameters, configuration parameters), or other values used in setting up and operating the devices 22, 24, 26.

Figure 3:
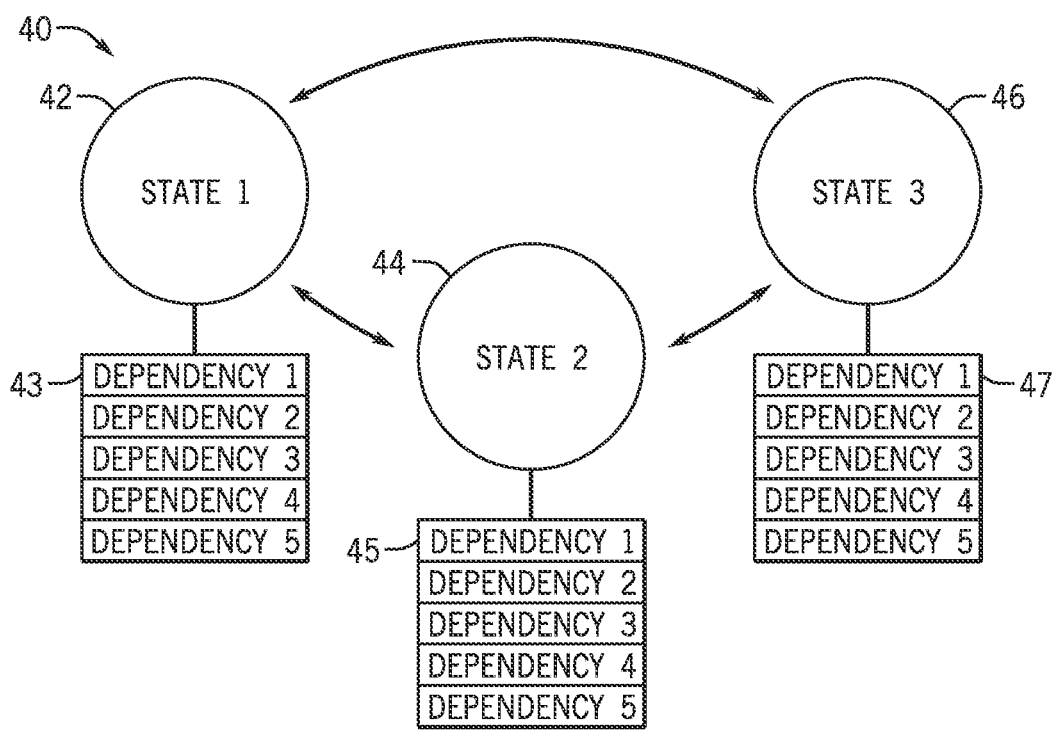
FIG. 3 is a block diagram of an embodiment of a state machine that may be used by the dynamic wizard of FIG. 2.

As described below, the dynamic wizard 36 may display the inputted values before the values are translated into adjustments to the devices (e.g., $D_1$ 22, $D_2$ 24, or $D_N$ 26). Advantageously, the dynamic wizard 36 may use a single screen 39 to receive the inputted values 39 instead of the multiple screens that may have been provided by using "Next" and "Back" buttons or other equivalents used in moving between screens, for example, in a linear fashion. Instead, the techniques described herein provide for using the single screen 39 for capturing value changes, for example, related to the devices 22, 24, 26 and then modifying the single screen 39 to direct the user to other changes based on the previous set of captured changes. Accordingly, the wizard 36 may support both linear as well as non-linear processes in which the user input 38 may result in updating the single screen 39 by dynamically activating and deactivating controls on the screen 39, adding and removing controls on the screen 39, updating controls on the screen 39, and/or reorganize controls on the screen 39. In certain embodiments, the wizard 36 may use a state diagram, as described in more detail below, to provide for linear and non-linear processes useful in adjusting the devices 22, 24, 26. dynamic wizard FIG. 3 is a block diagram of an embodiment of a finite state machine 40 that may be used by the dynamic wizard of FIG. 2 to provide for linear and non-linear information capture processes, such as processes useful in capturing the information 38 and then adjusting the devices 22, 24, 26 according the the linear or non-linear processes. For example, the depicted state machine 40 may represent a non-linear adjustment process provided by the manufacturer of the devices 22, 24, 26 and used to commission or place the devices 22, 24, 26 into operations within the system 10. The state machine 40 may be provided as instructions stored in non-transitory computer readable medium, such as a memory of the computing system 12, and executable, for example by a processor of the computing system 12.

As described above, the dynamic wizard 36 may visually capture and represent the user input 38 from the user entity. Each circle in the state machine 40 indicates a state 42 of the dynamic wizard 36. The dynamic wizard 36 may switch between the states 42 based on the user input 38. That is when a desired input 38 is received, for example certain values are inputed and a button control is pressed, the state 42 may then use one or more dependencies 43 that are associated to the state 42. In the depicted embodiment, each state 42, 44, and 46 of the state machine 40 includes associated dependencies 43, 45, and 47, respectively. The state machine 40 may switch between states 42, 44, 46 based on the input 38 received, the dependencies 43, 45, 47, and/or the current state of the system 10, such as the state of the devices 22, 24, 26 (e.g., commissioned state, register values, firmware versions, and so on). Thus, state 42 may be based on a first set of operations useful in setting up one of the devices 22, 24, 26. As defined herein, operations for a field device include parameters used to operate the field device (such as parameters stored in field device registers), functions used to operate the field device (such as computer instructions or firmware executable by a control system or the field device), or any other value used in device operations. The state 42 may include a first visual representation for the screen 39 having any number of controls (e.g., buttons, list boxes, dropdown boxes, radio buttons, checkboxes, image controls, text controls, labels, static images, moving images, text, treeview controls, and so on) and visual information. Accordingly, the wizard 36 may use state 42 to display a first set of visuals and controls on the screen 39.

Based on the inputs 38, including values, checking of checkboxes, radio buttons inputs, and the like, the state machine 40 may then use the dependencies 43 to determine which state to move to next. Examples of possible dependencies 43, 45, 47 are outlined below and may include input-receiving controls (e.g., buttons, list boxes, dropdown boxes, radio buttons, checkboxes, treeview controls, and so on) configured to receive input from a user entity, user rights or privileges, user role (e.g., manufacturer, system administrator, commissioning engineer, operator) state of the device 22, 24, 26 undergoing adjustment, and/or state of any other component of the system 10. The state machine 40, may then, for example, move to state 46. State 46 may include a second visual representation for display on the screen 39 without retorting to the user pressing a "Next" button or similar navigation button. Changing the appearance of the dynamic wizard screen 39 based on the dependencies 43 may enable the user to more quickly adjust the operations of the system 10 without scrolling between multiple pages and/or switching between slides. Then, based on the input 38, the dependencies 47, the user rights or privileges, user role (e.g., manufacturer, system administrator, commissioning engineer, operator) state of the device 22, 24, 26 undergoing adjustment, and/or state of any other component of the system 10, the state machine 40 may move back to state 42 or to state 44, and then present a visual on the screen 39 representative of the current state. Indeed, a non-linear or linear process may be supported. By navigating to any number of states, such as the states 42, 44, 46, the state machine may accept user input 38 and transform the input 38 into adjustments of the system 10, including the devices 22, 24, 26. The adjustments may be transmitted based on entry into the state 42, 44, 46, exit from the state 42, 44, 46, or a combination thereof. It is to be noted that the state machine 40 depicted in FIG. 3 is only an example. Any number of states may be similarly represented and used to provide adjustments to the system 10 and/or devices 22, 24, 26. Likewise, any number of single direction links and dual direction links may be used to link states in the state machine 40.

Figure 4:
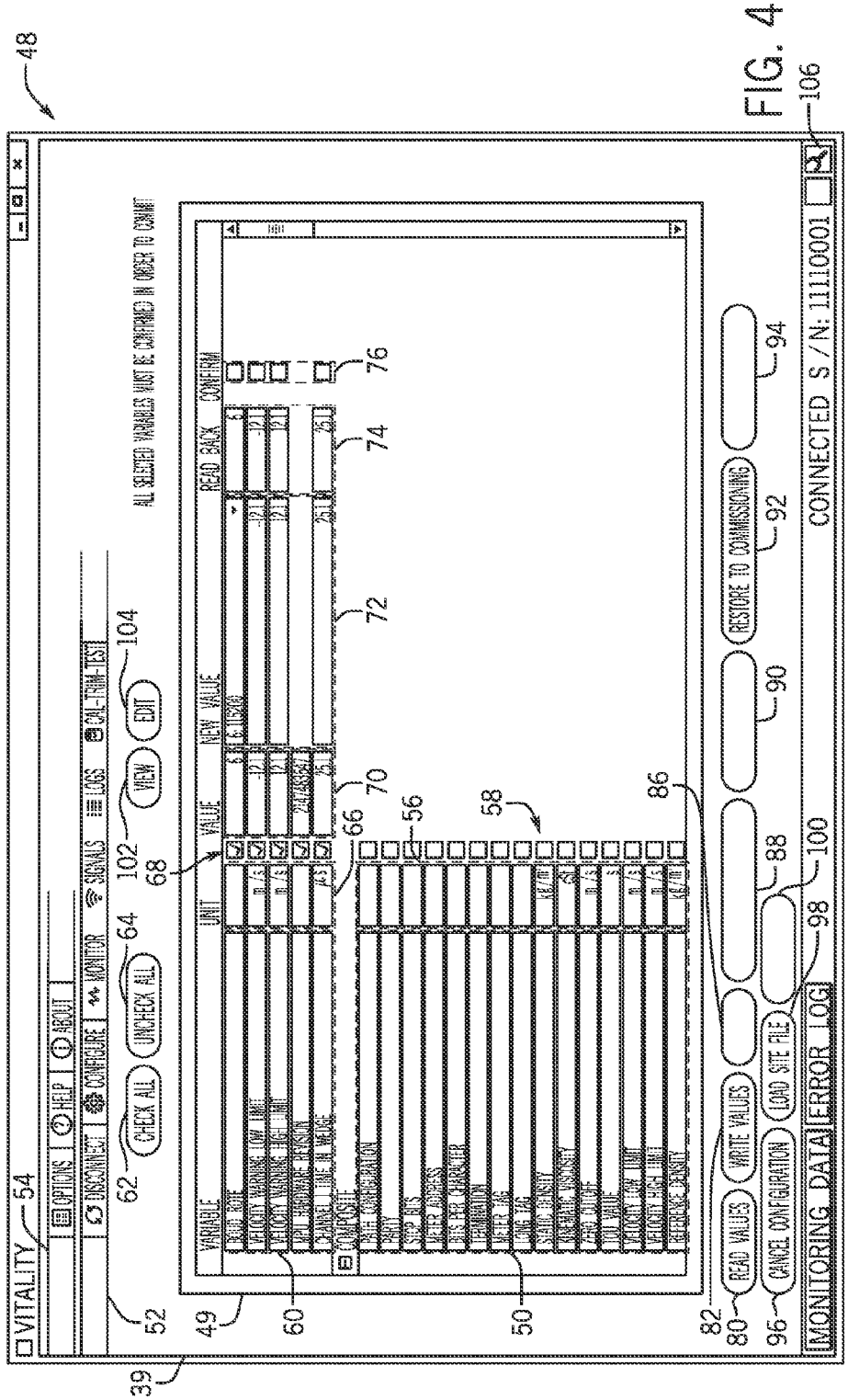
FIG. 4 is an embodiment of a possible user interface for the dynamic wizard of FIG. 2.

FIG. 4 is an embodiment of a possible user interface 48 of the dynamic wizard 36 of FIG. 2. The user interface 48 may be provided by the dynamic wizard 36, and may contain a display area 49. The display area 49 may include any number of GUI controls, and may display a list of parameter values, functions, firmware versions, operations, and so on, by using the GUI controls. Advantageously, the wizard 36 may use the single screen 39 to guide the user through a given configuration process, such as commissioning or otherwise installing the devices 22, 24, 26 for operations of the system 10. In one embodiment, all GUI controls and information related to the process (e.g., configuration process) supported by the wizard 36 is displayed by the single screen 39. Instead of then navigating backwards or forwards, for example, by using "Next" and/or "Back" buttons, the wizard 36 may activate or deactivate controls (e.g., display the control as grey) and information presented, thus guiding the user to through the next steps of the process until the process is completed. By presenting all controls and related information all at once and during the entirety of the process, the user may maintain an improved and uniform view of the process supported by the wizard 36. In another embodiment, the wizard may add or remove controls and other information (e.g., text) from the single window 39, in addition or alternative to activating and deactivating controls and information.

The controls enable a user to interact with components of the system 10, such as the devices 22, 24, 26, through the parameters, functions, operations, and the like. A first list of parameters 50 shows parameters that are available to be adjusted by the user entity. The parameters 50 are displayed and updated in the display area 48 when an input-receiving control 80 (e.g., button) is activated by a user entity. Other input-receiving controls may include checkboxes, dropdown listboxes, text boxes, treeview controls, comboboxes, links (e.g., hypertext links), and so on. As explained above, the visual representation of the user interface 48 (e.g., the display screen) may be altered by suing a number of dependencies associated with states of the state machine 40. One of the dependencies may include selecting an option from an operations bar 52 or a menu bar 54. For example, the parameters 50 listed as possibilities for adjustment may vary depending on the option selected in the operations bar 52 or the menu bar 54. The operations bar 52 may display different operations such as operations concerned with configuration of the device, monitoring of the device, signals given or received by the device, logs of data collected by or about the device, and tests that may be run by or on the device. Each of the different options for displaying parameters of the device may change the appearance of the display area 48 without actually changing the states 42, 44, 46 of the state machine 40, as described above. When certain dependencies are met, the state machine 40 may then change to another state in response.

Adjacent the first list of parameters 50 is a list of unit parameters 56 that displays units of measurement that may be associated with the adjacent parameter in the first list of parameters 50. The first list of parameters 50 and the second list of parameters 56, in some embodiments, may only display the parameters. Adjacent checkboxes 58 may enable a user entity to select a parameter from the first list of parameters 50 for inclusion into a parameter adjustment list 60. The checkboxes 58 may all be selected or deselected with a check all button 62 or a uncheck all button 64. Once the checkbox 58 for a parameter in the first list of parameters 50 is selected, the parameter appears in the adjustment list 60, and the accompanying unit parameter 56 appears in the adjustment unit parameter list 66. The checked checkboxes 68 also appear in a different (e.g., upper) area of the display area 48. Unchecking the checked boxes 68 returns the designated parameter (i.e., the parameter on the same row) to the first list of parameters 50.

When a parameter appears or is activated in the adjustment list 60, a value control 70, a new value control 72 and a read back control 74 may also appear or be activated. The value control 70 displays the current operating condition for the listed parameter (i.e., the parameter on the same row). The new value control 72 includes the ability for a user entity to input a value for the listed parameter. The new value control 72 may be a free input box or textbox, (e.g., the user entity inputs a value from a keyboard or other input device), it may be a dropdown menu or listbox (e.g., selecting the control brings up a number of options, from which the user selects the new value), or the new value control 72 may include another form of inputting a new value. The read back control 74 displays the value that has been input into the new value control 72. The display area 48 may also include a confirmation checkbox 76, the confirmation checkbox 76 may be selected before the new values input into the new value control 72 are written to the desired device 22, 24, 26.

Once the values are input into the new value control 72 and confirmed, the user entity may upload or commission the values to one or more storage locations within the system 10. A write values control 82 may write (e.g., commission, store, save) the current values (i.e., the values input into the new value control 72 and displayed in the read back control 74) into an intermediate memory where they may be referred to or delivered to the device at a later time. In the state illustrated in FIG. 4 and under the illustrated dependencies, a commit control 86, a commit to commissioning control 88, and a commit to factory control 90 are unavailable to the user entity. Graying-out of the control indicates the deactivation or more generally, the unavailability of the control to the user entity. The commit control 86 delivers the current values to the operational memory. The operational memory stores the values that the device uses as it operates. The commit to commissioning control 88 stores the values in a commissioning storage location for future reference. Similarly, the commit to factory control 90 stores the values in a factory storage location. Each of the commit control 86, commit to commission control 88, and commit to factory control 90 may be available to the user entity depending on the state 42 of the state machine 40 and the dependencies 43 associated with that state.

Other input-receiving controls include a restore to commissioning control 92, a restore to factory control 94, and a cancel configuration control 96. The restore to commissioning control 92 provides the user entity with the ability to revert parameters (e.g., the first list of parameters 50, the adjustment list 60, or some combination thereof) to the values that are stored in the commissioning storage location. Similarly, the restore to factory control 94 may restore parameters to the values stored in the factory storage location. The cancel configuration control 96 cancels or erases the changes that the user entity made in the new value control 72. Further results of selecting the cancel configuration control 96 are explained with regard to FIG. 7. Current, unchanged values (i.e., the parameter values read from the device before any changes are made in the new value control 72) may also be saved to and accessed from a custom location by selecting the load site file control 98 and the save site file control 100. The unchanged values may be loaded, for example, to view the parameters from a specific time in the past.

Another dependency 44 is illustrated by use of a view control 102 and an edit control 104. Activating the view control 102 or the edit control 104 may be mutually exclusive of the other, and provide the user entity with options that may be the same, may be different, or may have some options the same and some options different. Indeed, one dependency 44 may include states of multiple controls. For example, in the illustrated embodiment of FIG. 4, the edit control 104 is selected allowing the user entity access to the write values control 82, the restore to commissioning control 92, the restore to factory control 94, and the cancel configuration control 96. Selecting the view control 102 may disable these controls (i.e., the write values control 82, the restore to commissioning control 92, the restore to factory control 94, and the cancel configuration control 96) while still allowing the user entity access to the read values control 80. In other embodiments, controls in addition to the view control 102 and the edit control 104 may be provided, and/or the view control 102 and the edit control 104 may provide varied utility. As explained below, the dynamic wizard 36 may also include another dependency 44 related to the current access level, indicated by current access level control 106.

Figure 5:
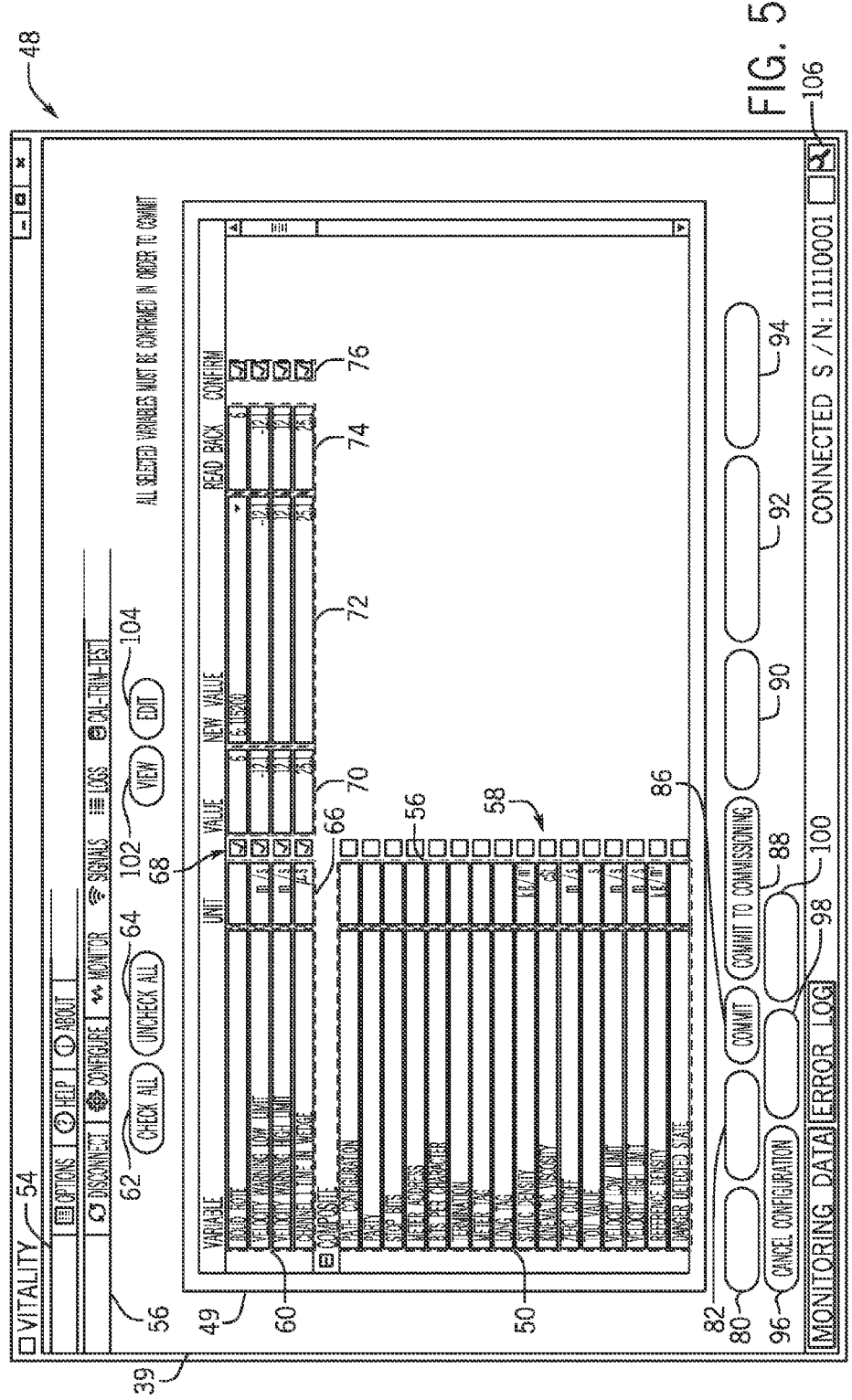
FIG. 5 is an embodiment of a possible user interface for the dynamic wizard of FIG. 2.

FIG. 5 is an embodiment of a possible user interface of the wizard 36 of FIG. 2. The embodiment in FIG. 5 shows the same user interface 48 provided by the same dynamic wizard 36. Because the figure includes similar elements to the elements of FIG. 4, the similar elements are represented using like numbers. The dynamic wizard 36 in FIG. 5 illustrates the use of dependency 44 based on the confirmation checkboxes 76. As illustrated, the checkboxes 76 are now checked, whereas in the embodiment illustrated in FIG. 4 the checkboxes 76 were unchecked. Checking the checkboxes 76 causes the dynamic wizard 36 to allow the user entity to have access to different controls. Specifically, in the illustrated embodiment, checking the checkboxes 76 allows the user entity access to the commit control 86 and the commit to commissioning control 88. The dynamic wizard 36 has also deactivated (e.g, grayed-out) the read values control 80 and the write values control 82, which disallows access by the user entity to these controls. The dynamic wizard 36 may change the controls based on checking a single checkbox 76, or may change the controls only after all the checkboxes 76 have been checked. Changing the controls between accessible and inaccessible enables a user entity to view the same display area 48 throughout the adjustment period. Thus, the user entity does not switch between pages of a wizard as would be the case with a wizard using 'Next' and 'Back' buttons.

Figure 6:
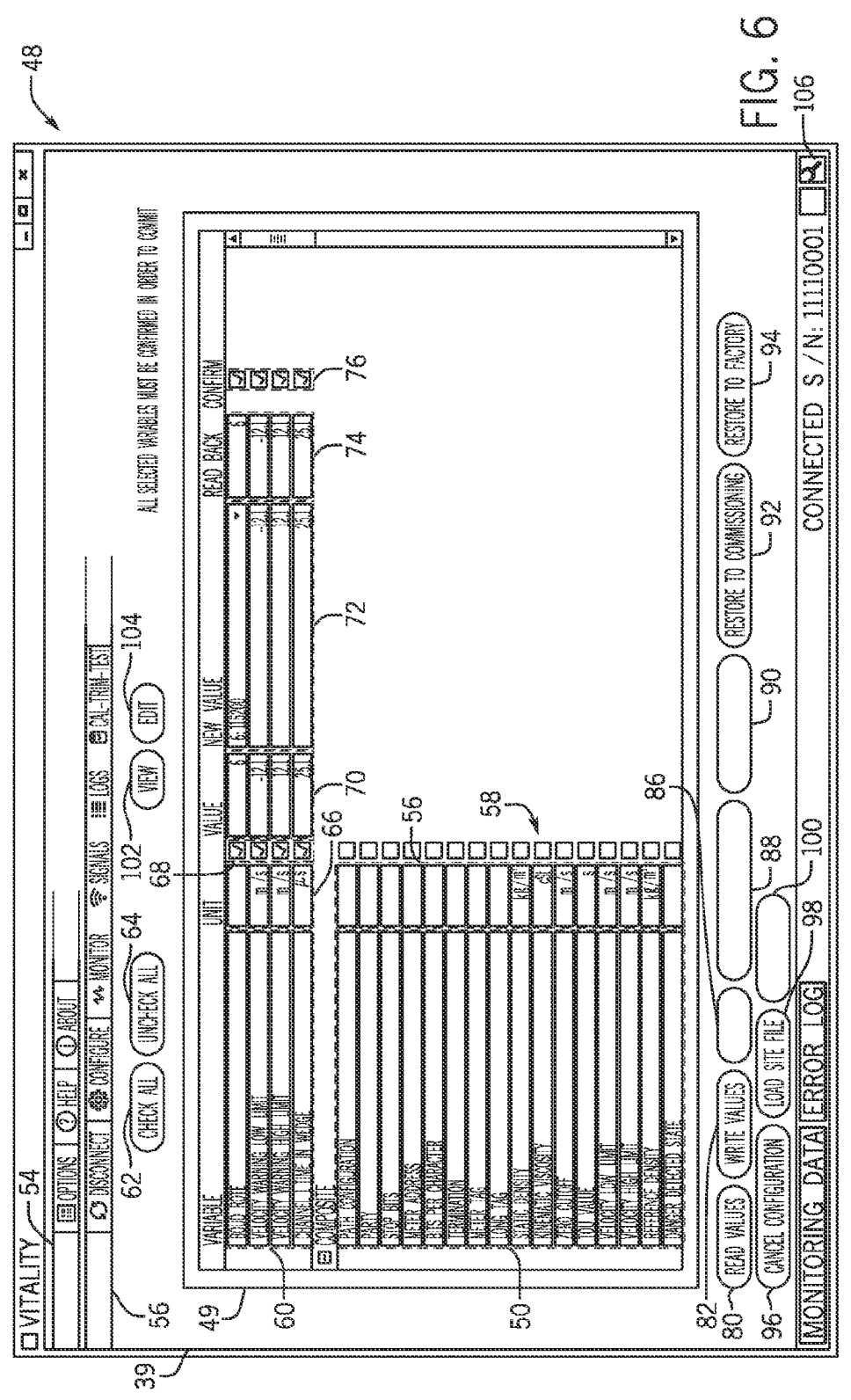
Figure 7:
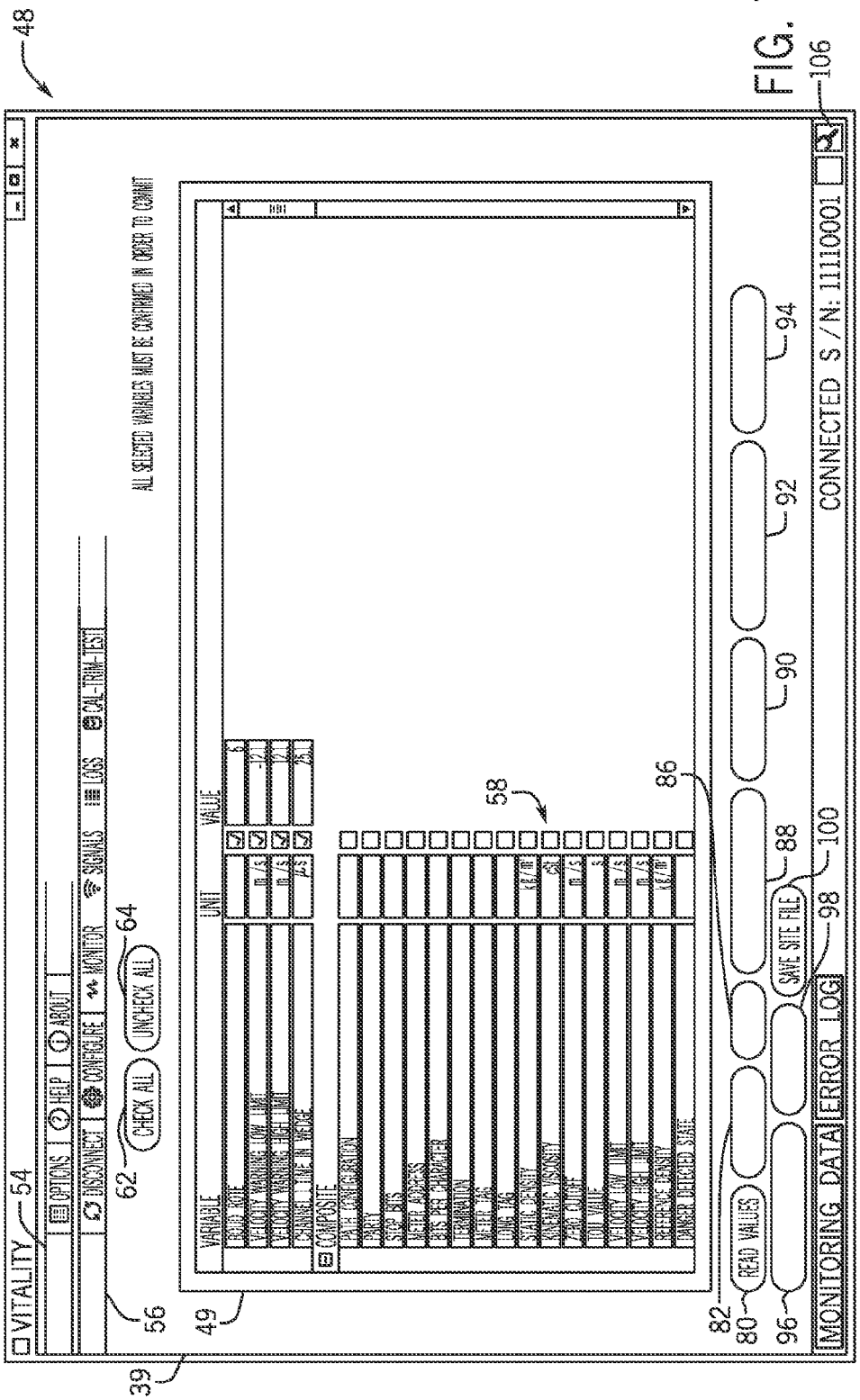
FIG. 7 is an embodiment of a possible user interface for the dynamic wizard of FIG. 2.

FIG. 6 is an embodiment of a possible user interface of the dynamic wizard engine of FIG. 2. The embodiment in FIG. 6 shows the same user interface 48 provided by the dynamic wizard 36 in FIGS. 4 and 5. Similar element numbers found in FIGS. 4 and 5 are represented using like numbers. The dynamic wizard 36 in FIG. 6 illustrates the dependency 44 based on the current access level. The current access level control 106 in FIG. 6 shows that the current access level is Factory. FIGS. 4 and 5 show a current access level of Ranch. The Factory access level shown in FIG. 6 allows the user entity to activate the restore to factory control 94. In other embodiments, an access level may allow the user entity to activate other controls while restricting access to still further controls. FIG. 7 also shows changes made to the user interface 48 (e.g., screen 39) based on the dependency of current access control. The current access level control 106 indicates that the user entity is signed in under a default access level. Under this access level, the user is not allowed access to any of the editing controls. The user entity may only read the values using the read value control 80 and save the values using the save site file control 100. As illustrated, this limited access is shown in the lack of the new value control 72 and the read back control 74, and the confirmation checkboxes 76. By displaying all controls and data related to a given process in the single screen 39, the wizard 36 may more efficiently provide for adjustments of the system 10 and increase the user's information awareness.

Technical effects of the invention include providing a dynamic wizard 36 suitable for displaying controls (e.g., adjustment parameters 60, checkboxes 68, new value control 72, read back control 74, and confirmation checkbox 76) alternatively to 'Back' and 'Next' buttons. The dynamic wizard 36 may activate/deactivate and show/hide controls and related information in a single screen. The dynamic wizard 36 may modify the controls on the single screen based on dependencies (e.g., dependencies 43) that change the appearance of the screen 39, including the display area 48. The dependencies may include a configuration state, a display state, a state machine state, a device state, a system state, a user privilege (e.g., current access level), or a combination thereof.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A non-transitory computer readable medium storing instructions configured to:
   provide a configuration wizard, the configuration wizard configured to:
   1) retrieve a configuration state from a field device;
   2) store the configuration state as a first dependency;
   3) display, via a single screen:
      a first input-receiving control configured to receive a user input;
      a second input-receiving control configured to receive the user input; and
      a display area configured to display a first parameter value associated with the configuration state of the field device, wherein the first input-receiving control is displayed as active and the second input-receiving control is displayed as inactive;
   4) enable a user to change the first parameter value into an updated parameter value; and
   5) based on the first dependency and the change to the updated parameter value, write the updated parameter value into the field device and display the second input receiving control as active.

2. The non-transitory computer readable medium of claim 1, wherein the display area is configured to display a second parameter value associated with the device and not to display the first parameter value based on a second dependency.

3. The non-transitory computer readable medium of claim 2, wherein the first or the second dependency comprises a configuration state, a display state, a state machine state, a device state, a user privilege, or a combination thereof.

4. The non-transitory computer readable medium of claim 1, comprising a finite state machine having at least a first and a second state, wherein the wizard executes the finite state machine to display a first visual screen representation associated with the first state and a second visual screen representation associated with the second state in the single screen.

5. The non-transitory computer readable medium of claim 4, wherein each state in the finite state machine comprises a dependency list, and wherein the display area is configured to display a second parameter value associated with the device in a second control and not to display the first control based on the dependency list included in a current state of the finite state machine.

6. The non-transitory computer readable medium of claim 1, wherein the device comprises a field device configured to sense a machinery condition, to actuate a machinery, or a combination thereof, and wherein the first parameter value comprises configuration parameters, data monitoring operations, test operations, calibration operations, log operations, or a combination thereof, for adjusting the field device.

7. The non-transitory computer readable medium of claim 6, wherein the field device comprises a flow meter configured to sense a liquid or gas flow.

8. The non-transitory computer readable medium of claim 1, wherein the first input-receiving control comprises a button, a checkbox, a listbox, a combobox, a dropdown menu, a textbox, a radio button, or a combination thereof.

9. The non-transitory computer readable medium of claim 1, wherein the wizard is configured to always display in the single screen all controls and information used in adjusting the device.

10. A method, comprising:
   1) retrieving a configuration state from a field device;
   2) storing the configuration state as a first dependency;
   3) providing a configuration wizard, the configuration wizard configured to display via a single screen:
      a first input-receiving control configured to receive a user input;
      a second input-receiving control configured to receive the user input;
      a display area configured to display a first parameter value associated with the configuration state of the field device, wherein the first input-receiving control is displayed as active and the second input-receiving control is displayed as inactive 4) enabling a user to change the first parameter value into an updated parameter value; and 5) based on the first dependency and the change to the updated parameter value, writing the updated parameter value into the field device and display the second input receiving control as active.

11. The method of claim 10, wherein the display area is configured to display a second parameter value associated with the device and not to display the first parameter value based on a second dependency.

12. The method of claim 11, wherein the first or the second dependency comprises a configuration state, a display state, a state machine state, a device state, a user privilege, or a combination thereof.

13. The method of claim 10, comprising navigating a finite state machine having at least a first and a second state, wherein the wizard executes the finite state machine to display a first visual screen representation associated with the first state and a second visual screen representation associated with the second state in the single screen.

14. The method of claim 13, wherein each state in the finite state machine comprises a dependency list, and wherein the display area is configured to display a second parameter value associated with the device in a second control and not to display the first control based on the dependency list included in a current state of the finite state machine.

15. The method of claim 10, wherein the device comprises a field device configured to sense a machinery condition, to actuate a machinery, or a combination thereof, and wherein the first parameter value comprises configuration parameters, data monitoring operations, test operations, calibration operations, log operations, or a combination thereof, for adjusting the field device.

16. The method of claim 10, comprising deriving a color based on a user account associated with the field device, and displaying the second color on a device.

17. A system, comprising:
a processor configured to:
1) retrieve a configuration state from a field device;
2) store the configuration state as a first dependency;
3) display a configuration wizard configured to configure a device, the configuration wizard comprising:
a first input-receiving control configured to receive a user input;
a second input-receiving control configured to receive the user input;
a single display screen configured to display the first and second input-receiving controls and comprising:
a display area configured to display a first parameter value associated with the configuration state of the field device, wherein the first input-receiving control is displayed as active and the second input-receiving control is displayed as inactive;
4) enable a user to change the first parameter value into an updated parameter value; and
5) based on the first dependency and the change to the updated parameter value, write the updated parameter value into the field device and display the second input receiving control as active.

18. The system of claim 17, wherein the display area is configured to display a second parameter value associated with the device and not to display the first parameter value based on a second dependency.

19. The system of claim 18, wherein the first or the second dependency comprises a configuration state, a display state, a state machine state, a device state, a user privilege, or a combination thereof.

20. The system of claim 17, comprising a finite state machine having at least a first and a second state, wherein the wizard executes the finite state machine to display a first visual screen representation associated with the first state and a second visual screen representation associated with the second state in the single screen.

* * * * *